(12) United States Patent
Anantaraman et al.

(10) Patent No.: US 9,418,013 B2
(45) Date of Patent: Aug. 16, 2016

(54) SELECTIVE PREFETCHING FOR A SECTORED CACHE

(71) Applicants: Aravindh V. Anantaraman, Folsom, CA (US); Zvika Greenfield, Kfar Sava (IL); Anant V. Nori, Banglore (IN); Julius Yuli Mandelblat, Haifa (IL)

(72) Inventors: Aravindh V. Anantaraman, Folsom, CA (US); Zvika Greenfield, Kfar Sava (IL); Anant V. Nori, Banglore (IN); Julius Yuli Mandelblat, Haifa (IL)

(73) Assignee: INTEL CORPORATION, Santa Clara, CA (US)

( * ) Notice: Subject to any disclaimer, the term of this patent is extended or adjusted under 35 U.S.C. 154(b) by 198 days.

(21) Appl. No.: 14/319,533

(22) Filed: Jun. 30, 2014

(65) Prior Publication Data

US 2015/0378919 A1 Dec. 31, 2015

(51) Int. Cl.
*G06F 12/00* (2006.01)
*G06F 12/08* (2016.01)

(52) U.S. Cl.
CPC ........ *G06F 12/0862* (2013.01); *G06F 12/0897* (2013.01); *G06F 2212/1021* (2013.01); *G06F 2212/152* (2013.01); *G06F 2212/602* (2013.01); *G06F 2212/604* (2013.01)

(58) Field of Classification Search
CPC ............ G06F 12/0862; G06F 12/0897; G06F 2212/1021; G06F 2212/152; G06F 2212/602; G06F 2212/604
See application file for complete search history.

(56) References Cited

U.S. PATENT DOCUMENTS

| | | | |
|---|---|---|---|
| 2003/0154345 A1* | 8/2003 | Lyon | G06F 12/0864 711/122 |
| 2013/0031312 A1* | 1/2013 | Jones | G06F 12/0862 711/137 |

* cited by examiner

*Primary Examiner* — Gurtej Bansal
(74) *Attorney, Agent, or Firm* — Compass IP Law

(57) ABSTRACT

A memory subsystem includes memory hierarchy that performs selective prefetching based on prefetch hints. A lower level memory detects a cache miss for a requested cache line that is part of a superline. The lower level memory generates a request vector for the cache line that triggered the cache miss, including a field for each cache line of the superline. The request vector includes a demand request for the cache line that caused the cache miss, and the lower level memory modifies the request vector with prefetch hint information. The prefetch hint information can indicate a prefetch request for one or more other cache lines in the superline. The lower level memory sends the request vector to the higher level memory with the prefetch hint information, and the higher level memory services the demand request and selectively either services a prefetch hint or drops the prefetch hint.

20 Claims, 7 Drawing Sheets

| SERVICE REQUEST BUFFER 200 | | | | | | | | |
|---|---|---|---|---|---|---|---|---|
| | CL0 | CL1 | CL2 | CL3 | CL4 | CL5 | CL6 | CL7 |
| REQUEST0 | V | V | P | P | P | V | D | V |
| REQUEST1 | V | V | D | P | P | I | V | I |
| REQUEST2 | P | P | P | P | D | V | V | V |
| REQUEST3 | V | I | D | I | I | V | I | I |

SELECTIVE PREFETCHING FOR A SECTORED CACHE

FIELD

Embodiments of the invention are generally related to memory devices, and more particularly to prefetching in a hierarchical memory architecture.

COPYRIGHT NOTICE/PERMISSION

Portions of the disclosure of this patent document may contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright ©2014, Intel Corporation, All Rights Reserved.

BACKGROUND

Processors operate at much higher speeds than the memory devices that store the data executed by the processor. Many systems implement hierarchical caching or a hierarchical memory subsystem. In a hierarchical system, smaller, faster caches are connected to the processor, and the processor accesses data from them. The smaller, faster caches in turn access data from larger, slower caches. There may be several levels of caching. It will be understood that the cache devices could also be referred to as memory devices.

Prefetching data from slower memory into faster caches prior to being requested by an operation executed by the processor is a common technique to minimize request response latency. However, due to the fact that the data is requested by the cache prior to being requested by the processor, there is a risk that the data might be accessed by the cache, only to be evicted from the cache without being used by the processor. There are two aspects to prefetching that can controlled to manage the risk associated with prefetching the "wrong" data: prefetch accuracy, which indicates what lines of data to fetch; and, timeliness, which indicates when to access the lines of data.

Low prefetch accuracy results in wasted memory bandwidth due to fetching unwanted data from memory. Low prefetch accuracy and/or untimely prefetching can result in cache pollution when wrongly prefetched data evicts already present useful data. Traditional prefetch mechanisms use a "pull" model, where the requesting cache pulls the data from the higher level(s) of the memory hierarchy. For example, the last level cache (LLC) can send a prefetch request to the memory controller, causing the memory controller to send the data back. With a pull model, the requestor is unaware of the load on the higher level memory (the bandwidth provider), and so lacks information to determine whether or not it should make a prefetch request. Additionally, mechanisms to throttle the requestor do exist, but typically require complex messaging between the requestor and the higher level memory, which consumes valuable transfer bandwidth.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, and/or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

FIG. 2 is a block diagram of an embodiment of a service request vector.

Figure 1:
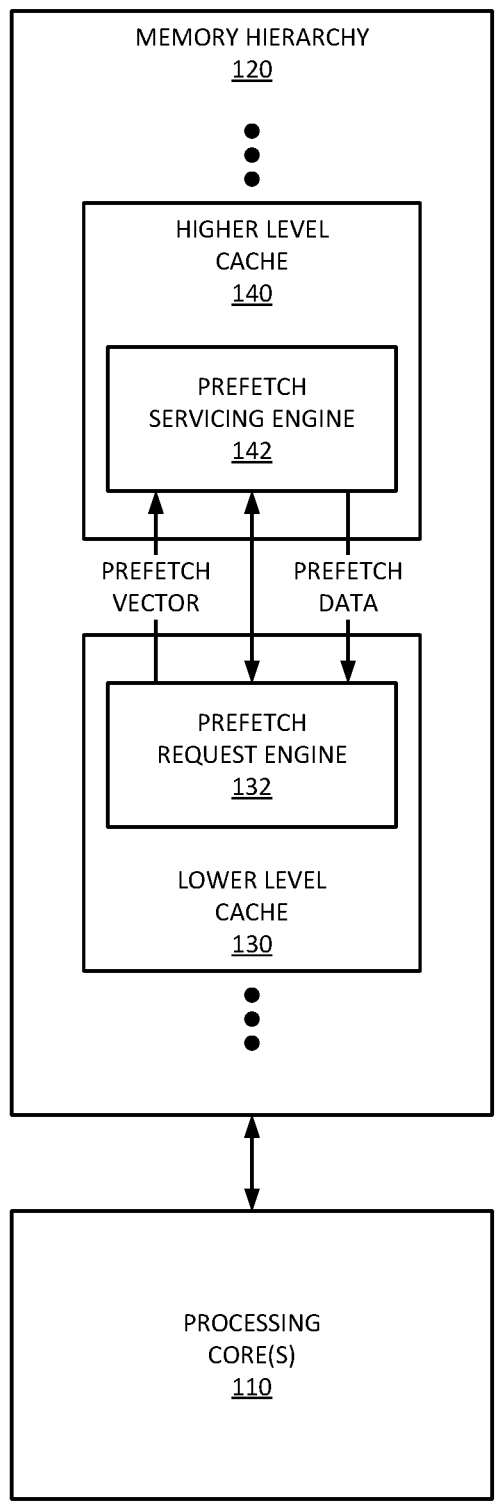
FIG. 1 is a block diagram of an embodiment of a system with a memory hierarchy that performs selective prefetching.

Descriptions of certain details and implementations follow, including a description of the figures, which may depict some or all of the embodiments described below, as well as discussing other potential embodiments or implementations of the inventive concepts presented herein.

DETAILED DESCRIPTION

As described herein, a memory subsystem includes a memory hierarchy that performs selective prefetching based on prefetch hints. A memory hierarchy includes multiple levels of cache devices or memory devices. The use of prefetch hints allows the implementation of a "push" model of prefetching. Unlike the traditional pull model, where the lower level cache determines what data the higher level cache will prefetch, the push model loosely couples the prefetch requesting and prefetch servicing (and thus somewhat decouples the prefetch requesting and prefetch servicing mechanisms). In a push model, the lower level cache device provides prefetch hints, which the higher level cache device can service or ignore, at the discretion of the higher level cache device.

A lower level memory detects a cache miss for a requested cache line that is part of a superline. The superline includes multiple cache lines. In one embodiment, a memory architecture includes a sectored cache, which groups multiple consecutive cache lines to form a sector, and multiple consecutive sectors to form a superline. Each superline is identified by a single tag (i.e., all the cache lines in a superline share a common tag) as opposed to having a tag per cache line. Cache lines within a superline can be identified within the tag by separate valid/dirty bits.

The lower level memory generates a request vector for the cache line that triggered the cache miss, including a field for each cache line of the superline. The request vector includes a demand request for the cache line that caused the cache miss, and the lower level memory can enhance the request vector with prefetch hint information. The prefetch hint information can indicate a prefetch request for one or more other cache lines in the superline. The lower level memory sends the request vector to the higher level memory with the prefetch hint information. Based on the prefetch hint information, the higher level memory makes determinations about what prefetches to service, if any. After fetching the prefetch data, the higher level memory device can push the prefetched data line(s) back to the lower level memory. Thus, the higher level memory services the demand request for the cache line that caused a cache miss in the lower level memory, and selectively either services a prefetch hint or drops the prefetch hint.

By decoupling prefetch hint generation and prefetch servicing, a memory subsystem can allow the lower level memory (e.g., a sectored cache) to identify which lines to prefetch without consideration for the load or other conditions at the higher level memory. The higher level memory would receive extremely accurate prefetch hints, but has the ability to decide which prefetch hints to service based on available memory bandwidth. It will be understood that the decision of which prefetch requests to service is solely within the discretion of the higher level memory device being requested to provide prefetch data.

In one embodiment, in a memory architecture that has superlines, the lower level memory device allocates space for an entire superline of cache lines when a tag is allocated for a superline. Thus, even if only a single cache line in the superline is valid, space is allocated for all cache lines in the superline. By generating prefetches only for superlines that are already allocated in the memory. Filling data into already allocated but unused space does not cause cache pollution. Thus, the selective prefetching described can completely eliminate cache pollution.

In one embodiment, the superline architecture can allow the lower level memory to detect streaming access patterns. In light of detected streaming access patterns, the lower level memory device can generate accurate, timely prefetch hints. For example, the valid bits in a superline can indicate which cache lines within the superline are already available or valid. Lines that whose valid bits are not set to TRUE are natural candidates to be prefetched. Lines that are invalid, but adjacent to one or multiple lines that have been requested by a demand request are very good candidates for prefetching.

In one embodiment, a lower level memory sends a prefetch hint vector with every demand request generated as a result of a cache miss. In one embodiment, the higher level memory decodes the prefetch vector and generates memory requests for all prefetch addresses possible, based on the current load of the higher level memory. The higher level memory sends accessed data back to the lower level memory, which can then fill the prefetched data into the data array and update the valid bits for the prefetched lines.

It is similar to a fire and forget request, but this goes beyond that. It is a fire and keep me posted request, where it doesn't worry about what doesn't come back, but interacts as far as what does come back. Thus, there are synchronous systems where both sides interact on every request that is generated. There are also fire and forget where once a request is send, the requesting side doesn't worry about it anymore. This is somewhere in between, where it doesn't worry about what doesn't come back, but it keeps tabs with the things that do come back.

Simulations indicate that selective prefetching as described herein provides performance benefits. Simulations of single-threaded workloads indicated a geomean gain of 1.13% with individual categories gaining up to 2.6% performance, with individual workloads gaining up to 30% performance. Simulations of multi-threaded workloads indicated 0.44% geomean performance gain with individual categories gaining up to 1.5%, with individual workloads gaining up to 20% performance.

FIG. 1 is a block diagram of an embodiment of a system with a memory hierarchy that performs selective prefetching. System 100 represents elements of a computing device or mobile device with a processor and a memory subsystem. Processing core(s) 110 represents any processor or central processing unit that can be associated with a memory subsystem or a cache device that is part of a memory hierarchy. Processing core 110 can be any single core or multicore device, as well as being a single core of a multicore device that is associated with a specific cache device that is part of a memory hierarchy.

Memory hierarchy 120 represents multiple levels of a memory or cache system associated with processing core 110. Memory hierarchy 120 includes lower level cache devices that are close to processing core 110, and higher level cache devices that are further from processing core 110. Processing core 110 accesses data stored in memory to perform operations. Processing core 110 accesses data from a lowest level of cache, which provides data directly to the processing core. If the data is not stored in the lowest level of cache, that cache level accesses data from a higher level of cache. The highest level of cache can be considered the memory devices of the main memory (e.g., typically a random access memory). There can be zero or more levels of cache in between a cache that provides data directly to the processing core and the highest level of cache (e.g., main memory). Each lower level of cache can make requests to a higher level of cache to access data, as is understood by those skilled in the art.

Memory hierarchy 120 is specifically illustrated with lower level cache 130 and higher level cache 140. In one embodiment, there can be one or more additional cache levels lower than cache 130 and/or one or more additional cache levels higher than cache 140; however, there are not necessarily additional cache levels from what is depicted in system 100. It will be understood that cache 130 can make a data request to cache 140 in the event of a cache miss at cache 130. A cache miss occurs when processing core 110 and/or a lower level cache (not specifically shown) requests data that is not currently stored at cache 130.

In addition to making requests in response to cache misses, cache 130 can make a prefetch request to cache 140. In one embodiment, prefetch request engine 132 of cache 130 generates a prefetch request vector to send to cache 140. Cache 140 receives and processes the prefetch request vector at prefetch servicing engine 142. In one embodiment, cache 130 sends a prefetch request vector with every demand request generated as a result of a cache miss. In one embodiment, the prefetch request vector is part of a request vector sent by cache 130 in response to a cache miss. For example, cache 130 can generate a request vector for a cache line that caused a cache miss, and prefetch request engine 132 can modify the request to include prefetch information. In one embodiment, prefetch request engine 132 is part of the logic or mechanism that produces the request vector.

In one embodiment, the prefetch information is selectively or optionally responded to by cache 140. Cache 140 will respond to a demand request to provide data for a cache line that caused a cache miss. In one embodiment, prefetch servicing engine 142 can selectively provide prefetch data in response to information in the prefetch request vector. Thus, cache 140 can determine whether or not to service a prefetch request. In such an architecture, cache 130 can make a determination what data to request for prefetch, and thus provide accurate prefetch information, while cache 140 can determine whether or not to service a prefetch request, and thus limit prefetching based on load at cache 140. In one embodiment, prefetch servicing engine 142 makes best efforts to prefetch data. Thus, cache 140 can be configured to service as many prefetch requests as possible, without interrupting service requests for data associated with cache misses. In one embodiment, cache 140 services demand requests and/or prefetch requests from multiple lower level caches.

In one embodiment, prefetch request engine 132 is part of and/or executed by a sectored cache controller. In one embodiment, prefetch servicing engine 142 is part of and/or executed by a memory controller (MC). Thus, a cache controller can be responsible for determining which cache lines are good prefetch candidates while the memory controller can be responsible for prefetching the data and sending the prefetched data back to the cache controller. In one embodiment, lower level cache 130, higher level cache 140, and the interface between them is extended in accordance with a prefetcher framework such as set forth in FIG. 3, and as described below with reference to system 300.

In one embodiment, the prefetch vector is a prefetch hint vector, which can provide a mechanism for piggybacking prefetch hint information from the cache controller or other lower level cache 130 to the memory controller or other higher level cache 140 without increasing pressure on the demand request interface between the two caches. As mentioned above, in one embodiment, cache 140 is not obligated to respond to every prefetch hint in the prefetch vector, and can selectively drop prefetch information (e.g., hints) based on availability or lack of availability of memory bandwidth.

As mentioned above, in one embodiment, every demand read request made by cache 130 can include a prefetch hint vector. In one embodiment, the prefetch vector indicates the status of each cache line in a superline that the demand read request belongs to. It will be understood that different implementations can use different labels and indications to pass request information to the higher level cache. In one embodiment, the status of each cache line can be identified or marked as valid (V), invalid (I), prefetch (P), or demand (D). The status of the individual cache lines can be placed in a field or bit for each cache line. Valid indicates that the cache line is already present in the cache. Invalid status indicates that the cache line is not present in the cache; a status of invalid does not necessarily indicate a request by the lower level cache for the cache line. In one embodiment, the lower level cache can mark a cache line as invalid to indicate that the cache line is missing from the cache, but that it is not a candidate for prefetching. Prefetch status indicates that the cache line is not present in the lower level cache and is a candidate to be prefetched. The states I and P provide a mechanism for the lower level cache to control which lines are candidates for prefetching. Demand status indicates the position of the cache line in the superline that is the subject of the demand request.

It will be understood that because prefetch request engine 132 can determine whether to mark a cache line as invalid or prefetch, cache 130 can be configured to be more or less aggressive with prefetching. For example, in one embodiment, prefetch request engine 132 is configured with a limit on how many valid bits should be in a superline before requesting prefetch of another cache line in the superline. In one embodiment, unless there are a threshold number of valid cache lines in the superline, prefetch request engine 132 will not execute prefetching.

FIG. 2 is a block diagram of an embodiment of a service request vector. Service request buffer 200 represents buffer with multiple service request vectors and/or prefetch request vectors in accordance with any embodiment described herein. In one embodiment, service request buffer 200 is an example of a buffer that can be included in prefetch service engine 142 of system 100, which can receive request vectors such as those sent by prefetch request engine 132 of system 100.

Service request buffer 200 includes three request vectors illustrated: Request 0, Request 1, Request 2, and Request 3. It will be understood that each request is illustrated for a different purpose, and these request vectors would not necessarily all be included in the same service request buffer of an actual implementation. Each request vector is associated with a superline that provides tag information for eight individual cache lines (CL0-CL7). It will be understood that a superline can include more cache lines that the eight represented. A superline could also include information for fewer than eight cache lines. A superline is used for a sectored cache, which can represent tag information and generate a request vector for multiple cache lines. Thus, the amount of storage required for tag data in a cache can be reduced by a factor of nearly the number of cache lines per superline (e.g., eight as illustrated, and could be extended to 12, 16, or some other number). In one embodiment, a superline represents 16 cache lines, but the request vectors illustrated only represent eight cache lines each for simplicity.

In one embodiment, space is allocated in the cache for all cache lines that can be represented by the superline (thus, as illustrated, each superline allocated would cause allocation of space for eight cache lines). The space for the cache lines could be allocated regardless of whether all cache lines are filled with valid data. The request vectors illustrated take advantage of an implementation where space is already allocated for each cache line. For example, if space is already allocated for the cache lines, prefetching the data will not cause cache pollution, since the prefetched data can simply be placed in the space allocated for the cache line. The risk of wasting memory bandwidth is reduced by allowing the higher level memory or higher level cache to selectively service the prefetch requests. Additionally, prefetch accuracy can be maintained at a high rate by allowing the lower level cache or lower level memory to generate the prefetch requests based on data likely to be used by the processor. In one embodiment, service request buffer 200 can receive and buffer more service requests than the four illustrated.

Request 0 is illustrated with values or indicators "V V P P P V D V" in the fields for CL0 through CL7, respectively. As mentioned above, in one embodiment, the lower level memory (e.g., a cache controller) can mark each cache line of the superline with valid (V), demand (D), prefetch (P), or invalid (I). In Request 0, cache lines 0, 1, 5, and 7 are valid, and cache line 6 is the current demand miss. In one embodiment, the lower level memory determines that cache lines 2, 3, and 4 are candidates for prefetch, and thus marks each cache line as P. It will be understood that Request 0 is a demand request vector from the perspective of making a cache miss demand for cache line 6. Request 0 is also a prefetch hint vector from the perspective that prefetch hints are provided for cache lines 2, 3, and 4.

Request 1 is illustrated with values or indicators "V V D P P I V I" in the fields for CL0 through CL7, respectively. Request 1 illustrates that the lower level memory can selectively determine which cache lines to prefetch, and which cache lines to mark as invalid instead of requesting prefetch. In Request 1, cache lines 0, 1, and 6 are marked as valid, and cache line 2 is the current demand miss. Cache lines 3, 4, 5, and 7 are all invalid in the superline. In one embodiment, the lower level memory determines based on the current demand at the lower level cache that cache lines 3 and 4 are candidates for prefetch, but cache lines 5 and 7 are not candidates for prefetch, at least not with the current demand request. In one embodiment, the lower level memory can also make the determination of what cache lines to request prefetch based on monitoring how the higher level memory has responded to recent prefetch requests. For example, the lower level memory can monitor what prefetch requests have been made, and whether they were serviced. If the lower level memory determines that the higher level memory is under significant load, it may determine to make fewer (or no) prefetch requests. Thus, in Request 1, the lower level memory marks cache lines 3 and 4 for prefetch, and marks cache lines 5 and 7 as invalid.

Request 2 is illustrated with values or indicators "P P P P D V V V" in the fields for CL0 through CL7, respectively. Request 2 illustrates how the lower level memory can function as a stream detector. For example, in one embodiment, the lower level memory can determine that cache lines 7, 6, and 5 are all valid, and that cache line 4 is the current demand miss. Thus, the lower level memory could determine that the superline that is the subject of Request 2 holds cache lines that are part of a stream of data, which is being requested. Thus, if each of cache lines 0, 1, 2, and 3 are invalid, the lower level memory can mark them as prefetch, expecting that they will be requested soon by the processor. Request 2 shows the stream of data going in reverse order of C7 to C0, but the same technique would work in order as well (e.g., if the first cache lines in order were valid up to a cache line that is the subject of a demand request).

Request 3 is illustrated with values or indicators "V I D I I V I I" in the fields for CL0 through CL7, respectively. Request 3 illustrates an embodiment where a lower level memory does not make any prefetch requests unless there are a threshold number of valid cache lines in the superline. Assume for Request 3 that the system has a threshold of three cache lines that must be valid before the lower level memory makes a prefetch request. Since only cache lines 0 and 5 are valid, the lower level cache detects that the superline does not have the threshold number of valid cache lines, and thus does not make any prefetch requests. Thus, cache lines 0 and 5 are marked as valid, and cache line 3 is marked as a demand. Cache lines 1, 3, 4, 6, and 7 are all marked as invalid, without any being marked for prefetch.

Thus, the lower level memory can selectively mark cache lines for prefetch or not, and the higher level memory (the bandwidth provider) can selectively drop the prefetch hint information without servicing the prefetch request. Such a loosely coupled prefetching mechanism allows the lower level cache to make determinations as to what cache lines should be prefetched, but allows the higher level memory to determine whether or not a prefetch request can or will be serviced. Thus, the prefetch requests can be referred to as prefetch hints, since the higher level memory has autonomy to ignore the request. Also, the system designer can control the aggression of the prefetching by the lower level memory. By placing a threshold of three valid cache lines before the lower level memory can make a prefetch request, the lower level memory will not be as aggressive in prefetching. By setting a threshold of 1, or even eliminating the threshold, the lower level memory can be more aggressive in making prefetch requests.

Figure 3:
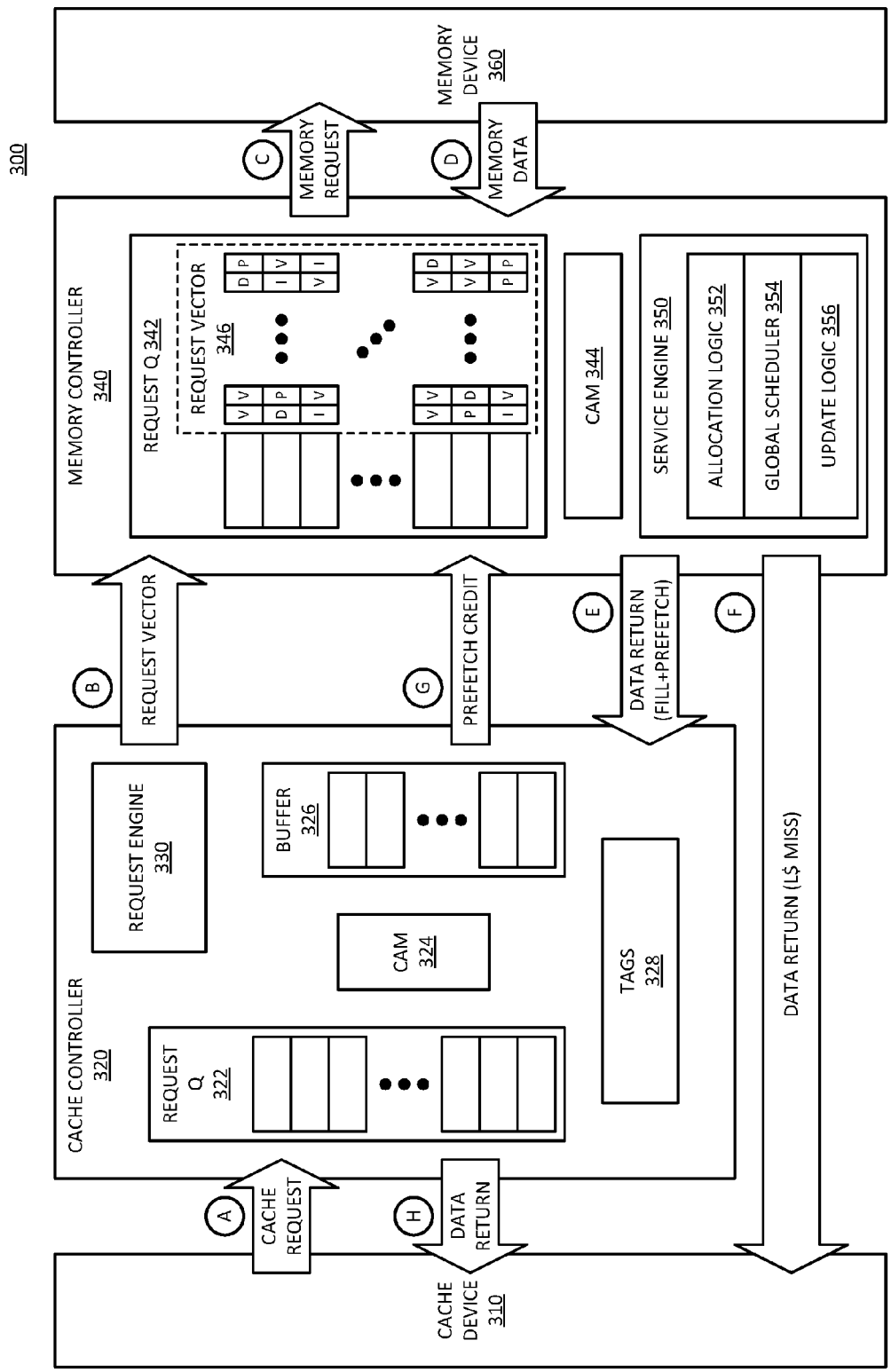
FIG. 3 is a block diagram of an embodiment of a system to provide dynamic selective prefetching between a cache controller and a memory controller.

FIG. 3 is a block diagram of an embodiment of a system to provide dynamic selective prefetching between a cache controller and a memory controller. System 300 represents a computing system with a hierarchical memory architecture that uses dynamic prefetching in accordance with any embodiment described herein. System 300 can be one example of an embodiment of system 100 of FIG. 1. System 300 can use a request vector such as those represented in FIG. 2.

System 300 includes cache device 310 and memory device 360. Cache device 310 is associated with cache controller 320, and memory device 360 is associated with memory controller 340. Certain descriptions refer to a lower level memory sending a service request to a higher level memory. Such descriptions can be understood as a controller for a lower level memory sending a service request to a controller of the higher level memory. Thus, reference to the memory can be shorthand to refer to a controller that manages the I/O to and from the memory. Cache device 310 and/or cache controller 320 can thus be considered a "lower level memory" in accordance with certain descriptions, and memory device 360 and/or memory controller 340 can be considered a "higher level memory" in accordance with certain descriptions.

Cache device 310 includes one or more arrays of storage elements (not specifically shown). In one embodiment, cache device 310 is organized and/or managed as a sectored cache. Memory device 360 includes one or more arrays of storage. Memory device 360 is larger and slower than cache device 310. Cache device 310 is located closer to an associated processor or processing core than memory device 360. In one embodiment, cache device 310 receives data requests directly from the associated processor or processing core. In one embodiment, cache device 310 receives data requests from a lower level memory device or circuit.

In one embodiment, cache controller 320 is responsible for generating a prefetch vector for every read request that misses in the cache (i.e., the data is not in cache device 310 or cache controller 320). Cache controller 320 includes request queue 322, which is a buffer for incoming cache requests. In one embodiment, cache controller 320 includes content addressable memory (CAM) 324 to determine if an incoming request refers to data that is already in cache controller 320, and can be used to determine if the data is in prefetch buffer 326. In the case that data is already in the cache controller, it can return the data without having to request the data from memory controller 340. It will be understood that a content addressable memory refers to a hardware engine that implements a search. In one embodiment, CAM 324 compares a tag of an incoming cache request to data store in cache controller 320. CAM 324 can operate as a lookup table (LUT) with the superline tag identifying the index of the LUT entries.

Cache controller 320 includes tags 328 which are metadata used to manage data in cache controller 320. As mentioned above, a sectored cache can have a superline architecture where the superline includes data for multiple individual cache lines. Thus, rather than having a tag per cache line, cache controller 320 includes a tag per superline, where each superline tag includes a field (one or more bits) for each cache line as well as an identifier. Cache controller 320 can dequeue cache requests from request queue 322 and perform a tag lookup. When there is a tag match (i.e., superline hit) in response to the tag lookup, it indicates that the superline is in the cache controller. Cache controller 320 can read the state of the array to obtain individual cache line states (e.g., MEI).

In one embodiment, cache controller 320 includes request engine 330. Request engine 330 represents a prefetch request engine or other request generator in accordance with any embodiment described herein. Request engine 330 can be hardware and/or software logic in cache controller 320 that manages the generation of request vectors. In one embodiment, request engine 330 generates a service request or request vector based on information from tags 328 and/or state information about the cache lines. Request engine 330 can set a field or bit position corresponding to the miss request dequeued from request queue 322 to a demand indicator (e.g., 'D') or equivalent.

In one embodiment, request engine 330 sets other fields corresponding to other cache lines with state information for those cache lines. For example, fields corresponding to cache lines that have states of modified or exclusive (e.g., 'M' or 'E') states can be marked with a valid indicator (e.g., 'V') or equivalent. In one embodiment, for a cache line that is in an invalid state (e.g., 'I') or equivalent, cache controller can execute logic to apply one or more metrics, rules, or determination criteria to determine whether or not to request a prefetch of these cache lines. For cache lines to be prefetched, request engine 330 can mark their associated fields with a prefetch indicator (e.g., 'P') or equivalent. The prefetch indicator can be considered to be a prefetch request, because by generating the prefetch indicator, cache controller 320 is requesting prefetch of specified cache lines. However, because memory controller has full control over which prefetch requests to service, the prefetch indicator can also be considered to be a prefetch hint. For cache lines that will not be prefetched, request engine 330 can mark their associated fields with an invalid indicator (e.g., 'I') or equivalent.

In one embodiment, request engine 330 makes prefetch determinations based at least in part on a number of valid lines in the superline. For example, request engine 330 might set a cache line with a prefetch indicator only in the case that there are at least N valid cache lines in the superline, where N is then a threshold number of valid cache lines. Note that setting N to be one or greater implicitly prohibits superline misses (zero valid lines) from spawning prefetches. The higher the value of N, the less aggressively request engine 330 will generate prefetch requests. Cache controller 320 via request engine 330 can have full control over which cache lines will not be prefetched, even though it does not have control over which prefetch requests or hints memory controller 340 will service. As mentioned above, memory controller 340 can selectively drop any prefetch indicator generated by cache controller 320, but cache controller 320 can prevent a line from being prefetch by not marking it with a prefetch indicator.

In one embodiment, cache controller 320 includes buffer 326, which is a prefetch buffer to hold prefetch data returned from the memory controller. In one embodiment, buffer 326 is a separate buffer. In one embodiment, buffer 326 is a selected number of entries in request queue 322. In one embodiment, data returned by memory controller 340 includes metadata to indicate if the data is in response to a miss request (i.e., it is fill data) or if it is prefetch data. If the returned data is prefetch data, cache controller 320 places the data in buffer 326. In one embodiment, cache controller 320 does not allocate entries in buffer 326 until data is returned from memory controller 340. Thus, when returned data is prefetch data, cache controller can create or allocate a new entry in prefetch buffer 326. In one embodiment, the allocation request will arbitrate for lookup in the tag array of tags 328. If the lookup results in a superline hit, the state of the cache line corresponding to the request can be marked as exclusive, and the data sent to the data array of cache device 310. When the data is sent to the data array, the request can be deallocated from buffer 326. If the lookup results in a superline miss, the superline was evicted from cache controller 320 before the prefetch data could return from memory controller 340. In such a case, cache controller 320 can drop the prefetch data and the prefetch request can be deallocated from buffer 326.

In one embodiment, cache controller 320 engages in the exchange of credits or other flow control mechanism. With credits, when cache controller 320 deallocates a prefetch request from buffer 326, it also sends a credit back to memory controller 340. In one embodiment, cache controller 320 sends the results of a superline lookup for prefetched data back to memory controller 340 along with a credit. The results information is metadata that cache controller 320 sends to memory controller 340, which can acts as feedback information that allows memory controller 340 to stop additional prefetching for superlines that have been deallocated from cache controller 320. Additionally cache controller 320 can optionally forward information about new incoming read requests to memory controller 340 even before the requests have been looked up in the cache controller. Memory controller 340 can check to see if there are pending prefetch hints for the indicated cache lines, and invalidate the prefetch hints or escalate the prefetch hints to demand requests. Thus, the memory controller can avoid reading the data twice from memory device 360.

Memory controller 340 is responsible for tracking prefetch hints and other request vector data provided by cache controller 320. Memory controller 340 generates memory access commands and memory addresses for memory device 360 (e.g., a DRAM (dynamic random access memory). Memory controller 340 receives data from memory device 360 and sends the data back to cache controller 320 once the data is received.

Memory controller 340 includes request queue 342, which can include multiple request vectors 346. Request queue 342 (e.g., a read pending queue or RPQ) is a memory or storage structure that holds pending read requests until they are serviced. Each entry of request queue 342 includes a request vector 346, which can include prefetch hint information for the superline associated with the request. As illustrated, request vector 346 can include demand indicators (D), valid indicators (V), prefetch indicators (P), and invalid indicators (I). The specific indicators illustrated are randomly selected as representative of how actual data may appear.

In one embodiment, memory controller 340 includes an extra CAM port, CAM 344, to compare incoming request vectors with existing requests referencing the same superline. In one embodiment, CAM 344 can also represent the logic that can be included to handle CAM matches. In the case of a superline match for an incoming request vector, logic in memory controller 340 can merge the two prefetch vectors (and can also invalidate the prefetch vector associated with the older request).

Memory controller 340 includes service engine 350. Service engine 350 represents a prefetch servicing engine or other request servicer in accordance with any embodiment described herein. In one embodiment, service engine 350 and its component parts are part of request queue 342 or request queue 342 is part of service engine 350. Service engine 350 enables memory controller 340 to service demand requests and prefetch requests. Service engine 350 includes allocation logic 352, which refers to logic that controls allocation and deallocation of entries in request queue 342. Allocation logic 352 includes logic to determine when to deallocate an entry from the queue. In one embodiment, allocation logic 352 ensures that requests are not deallocated from request queue 342 immediately after the demand request associated with the entry is serviced. Thus, the request can remain longer in the queue to give time for memory controller 340 to see if it can service the prefetch hints in the associated request vector 346. Allocation logic 352 should, however, deallocate an entry as soon as all of its prefetch hints have been prefetched. In one embodiment, allocation logic 352 selects one or more entries from request queue 342 to deallocate to make room for new incoming requests. If one or more entries have to be removed so new entries can be buffered, allocation logic 352 determines which entries to remove. The entries to be removed will need to have the demand request serviced, and allocation logic 352 should invalidate any prefetch hints that are pending. The ability to deallocate requests that only have prefetch hints pending, can prevent prefetch requests from delaying incoming demand requests, which should take precedence. Thus, memory controller 340 can manage its bandwidth by selectively dropping prefetch hints, as discussed.

In one embodiment, service engine 350 includes global scheduler 354. In one embodiment, global scheduler 354 is part of memory controller 340 but not specifically part of service engine 350. Global scheduler 354 is responsible for arbitrating and selecting a winner from all the different agents that want to send commands to memory device 360. The different agents can be or include read pending queue(s), write pending queue(s), a maintenance engine that performs memory management operations, a page table, or other components. In one embodiment, global scheduler 354 supports different policies for scheduling prefetch requests. For example, global scheduler 354 may give prefetch requests the lowest priority and schedule them when there are no other memory access commands to schedule in a given cycle. In another example, global scheduler 354 can be allowed to send prefetches only when there are no pending demand requests, or when there are fewer than a threshold number of pending demand requests, or when a delay to service demand requests is less than a threshold time. Such implementations may require additional logic in service engine 350 and/or another part of memory controller 340 to track the number of pending demand requests, the delay between servicing demand requests, and/or other logic. In another example policy, global scheduler 354 can allow prefetches only in read major mode, where read major mode and write major mode can be operating modes in memory controller 340 where reads and writes are given highest priority, respectively. In one embodiment, global scheduler 354 monitors and ensures there are prefetch buffer credits available in cache controller 320 before sending a prefetch read to memory device 360.

In one embodiment, service engine 350 includes update logic 356. Update logic 356 can be responsible for changing pending requests to the correct state. For example, update logic 356 can change a request to page hit/miss when an activate command is sent, or to page empty when a precharge command is sent. Additionally, the value of request vectors 346 should be changed (e.g., from P to I) when a data access request is generated for prefetch data, to prevent prefetching the same cache line multiple times. Update logic 356 can also invalidate a prefetch vector when a page corresponding to the prefetch vector is closed. In one embodiment, memory controller 340 only services prefetch requests for open pages, and drops prefetch hints for pages that are not open.

Referring to the interactions between components of system 300, in one embodiment, the interactions can occur in the order specified in FIG. 3, starting at point A, and proceeding through point G. At point A, cache controller 320 receives a new incoming demand request or cache request. In one embodiment, cache controller 320 looks up the cache line (e.g., via CAM 324) in the prefetch buffer (buffer 326), and does not find a match. Cache controller 320 allocates the incoming request in request queue 322 where it waits to look up the cache tags in tags 328. Once the request is arbitrated to perform the tag lookup, cache controller 320 determines if there is a superline hit and a cache line hit. Assuming a superline hit, cache line miss, the superline is found in cache controller 320, but the requested cache line is invalid. Assume that other cache lines within the superline are valid, and others are invalid. Thus, cache controller 320 (e.g., via request engine 330) can generate a request vector including a demand request for the cache line that caused the cache miss, valid indicators for the valid cache lines, and zero or more prefetch indicators (depending on the prefetch policy). Assume that the request vector includes at least one prefetch hint.

At point B, cache controller 320 sends the request vector to memory controller 340. In one embodiment, memory controller 340 includes multiple channels. Memory controller 340 directs the request vector that has the demand request cache line. In one embodiment, entries are dequeued out of request queue 342 to a specific channel for servicing. In one embodiment, request queue 342 is associated with a specific channel. In the case where memory controller 340 includes multiple channels, one or more prefetch requests may be associated with a different channel than the demand request. For example, a certain number of fields can be directed to a first channel and others to another channel (e.g., cache lines 0, 2, 4, . . . , can be sent to a first channel, and cache lines 1, 3, 5, . . . , can be sent to a second channel). In one embodiment, memory controller 340 can interleave incoming requests by size, for example, having the first 1K of cache line space going to a first channel, and the next 1K going to a second channel. In the case of multiple channels, each channel can drop prefetch hints that are intended for a different channel.

In one embodiment, CAM 344 allows memory controller 340 to check a new incoming request against data in request queue 342. If an existing (older) request references the same superline, in one embodiment, request queue 342 merges the two requests and/or drops the older request. For example, assume that request queue 342 includes a request with three prefetch hints in its request vector 346, one of which has already been serviced. If a new request comes in for one of the prefetch hint cache lines, memory controller 340 can drop the previous request vector and generate a new request vector with a demand request instead of a prefetch request for the appropriate entry, and can maintain the other prefetch hint from the previous request.

Referring to point C, global scheduler 354 can arbitrate memory access requests by demand requests and prefetch hints for entries in request queue 342. Once bandwidth is available and the particular request has priority, memory controller 340 makes a memory access request to memory device 360, which returns the memory data, as seen at point D. It is important to note that even after a demand request is sent to memory device 360, the entry associated with the demand request in request queue 342 is not necessarily released. Memory controller 340 can maintain an entry in request queue 342 for a period of time or until space is needed in the request queue to allow a chance to service the prefetch hints. Not all entries in request queue 342 will have valid prefetch hints (e.g., if the request does not include prefetch information for reasons discussed herein, or if the request has no valid prefetch requests for the particular channel), and can thus be released from the queue once memory device 360 returns the data.

In one embodiment, memory controller 340 does not service prefetch requests until all outstanding demand requests have been serviced. In one embodiment, a certain threshold number or percentage of demand requests must be serviced prior to servicing a prefetch hint. In one embodiment, memory controller 340 can service prefetch hints as long as there is a threshold amount of bandwidth available, and/or if a demand request servicing delay is within a threshold. In one embodiment, even after a prefetch request wins arbitration, memory controller 340 may not make a memory request. In one embodiment, memory controller 340 must determine that it has sufficient credits available to the prefetch buffer in cache controller 320 prior to making a prefetch memory access request. In one embodiment, memory controller 340 will only make a prefetch memory access request for cache lines associated with an open page in memory. In another embodiment, memory controller 340 permits prefetch memory access requests to open new pages.

At point E, memory controller 340 sends data received from memory device 360 back to cache controller 320. In the case that there was a superline miss at cache controller 320, memory controller 340 can return data back to cache device 310, as shown at point F. Buffer 326 is a prefetch buffer, which can hold prefetch data sent back to cache controller 320 from memory controller 340. It will be understood that cache controller 320 can support a certain amount of bandwidth. Memory controller 340 can be configured to know the bandwidth limits of the cache controller. In one embodiment, system 300 implements a credit system where memory controller 340 will only service a prefetch request if there is space available in buffer 326. Cache controller 320 can indicate to memory controller 340 when it allocates space in the prefetch buffer. Similarly, cache controller 320 can indicate to memory controller when it deallocates space in buffer 326. Indicating the allocation of space can equate to using a credit, and deallocating can equate to generating a credit.

In one embodiment, cache controller 320 preallocates space in buffer 326 when it modifies a request vector with prefetch hint information. A system of preallocation would not require the system of credits. However, the preallocation system would require memory controller 340 to explicitly cancel or indicate to the cache controller when it drops a prefetch hint. The system of credits can be used with a post allocation mechanism, which can be more efficient than a preallocation system. In a post allocation system, buffer 326 only allocates space when the data comes back from the memory controller, instead of when the request is sent.

In one embodiment, data in buffer 326 waits to look up cache tags 328. If the lookup results in superline hit, buffer 326 can send the data back to the data array of cache device 310 (as shown at point H), as well as providing a valid indicator for a corresponding cache line in the cache controller. If the lookup results in a superline miss, in one embodiment, cache controller 320 drops the data out of buffer 326. Once prefetch data performs a lookup, cache controller 320 deallocates the superline from buffer 326 and can return a credit to memory controller 340.

The returning of the credit from cache controller 320 to memory controller 340 is illustrated at point G. In one embodiment, the prefetch credit includes metadata such as a superline hit or miss indicator. Memory controller 340 can examine the credit returned by cache controller 320 and determine whether to take further action with pending requests based on the credit metadata. For example, in response to a superline miss, memory controller 340 can invalidate any remaining prefetches to the associated superline, since the superline is no longer in the cache controller.

Figure 4A:
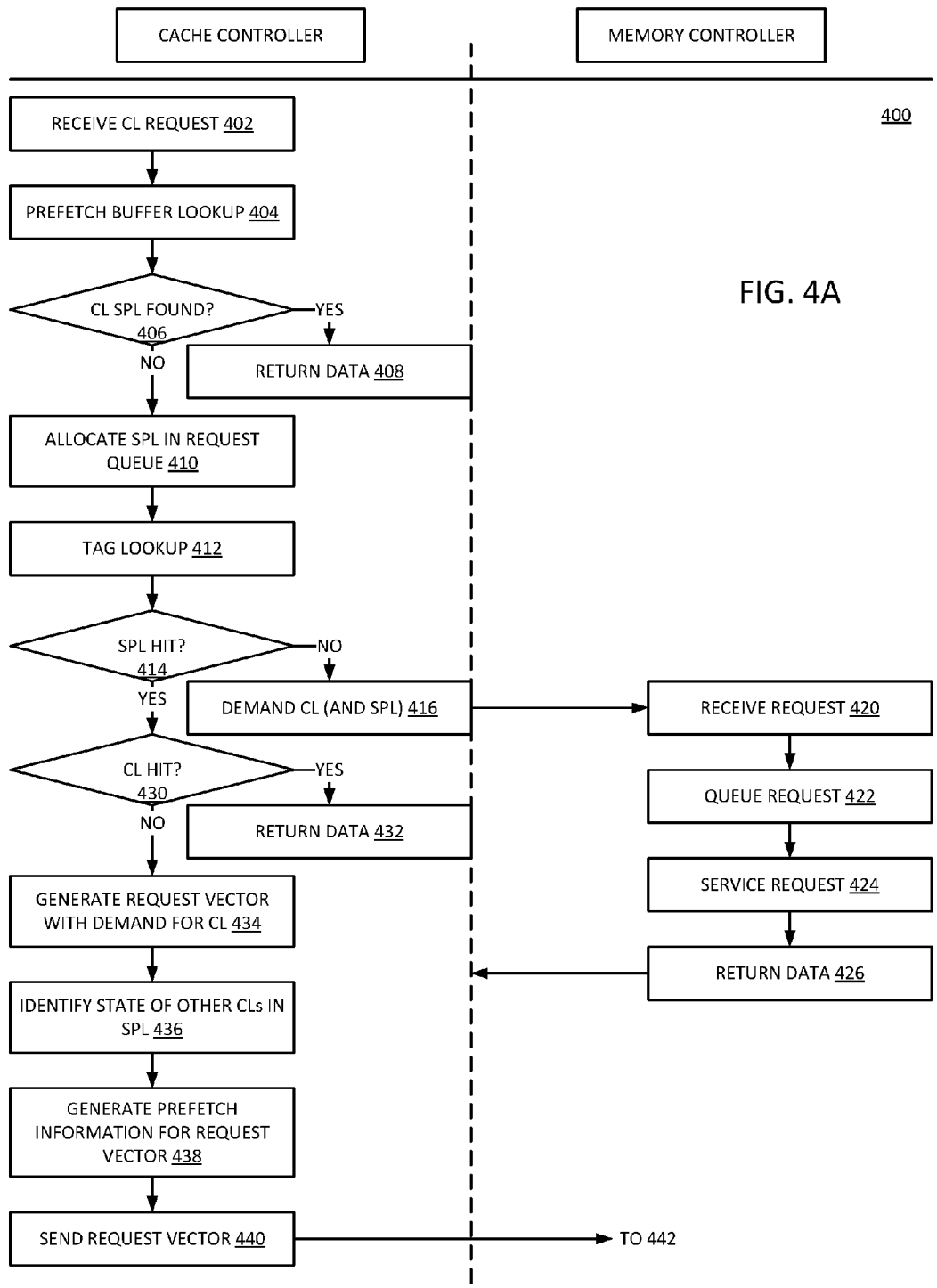
FIGS. 4A-4B illustrate a flow diagram of an embodiment of a process for selectively prefetching using a service request vector.
Figure 4B:
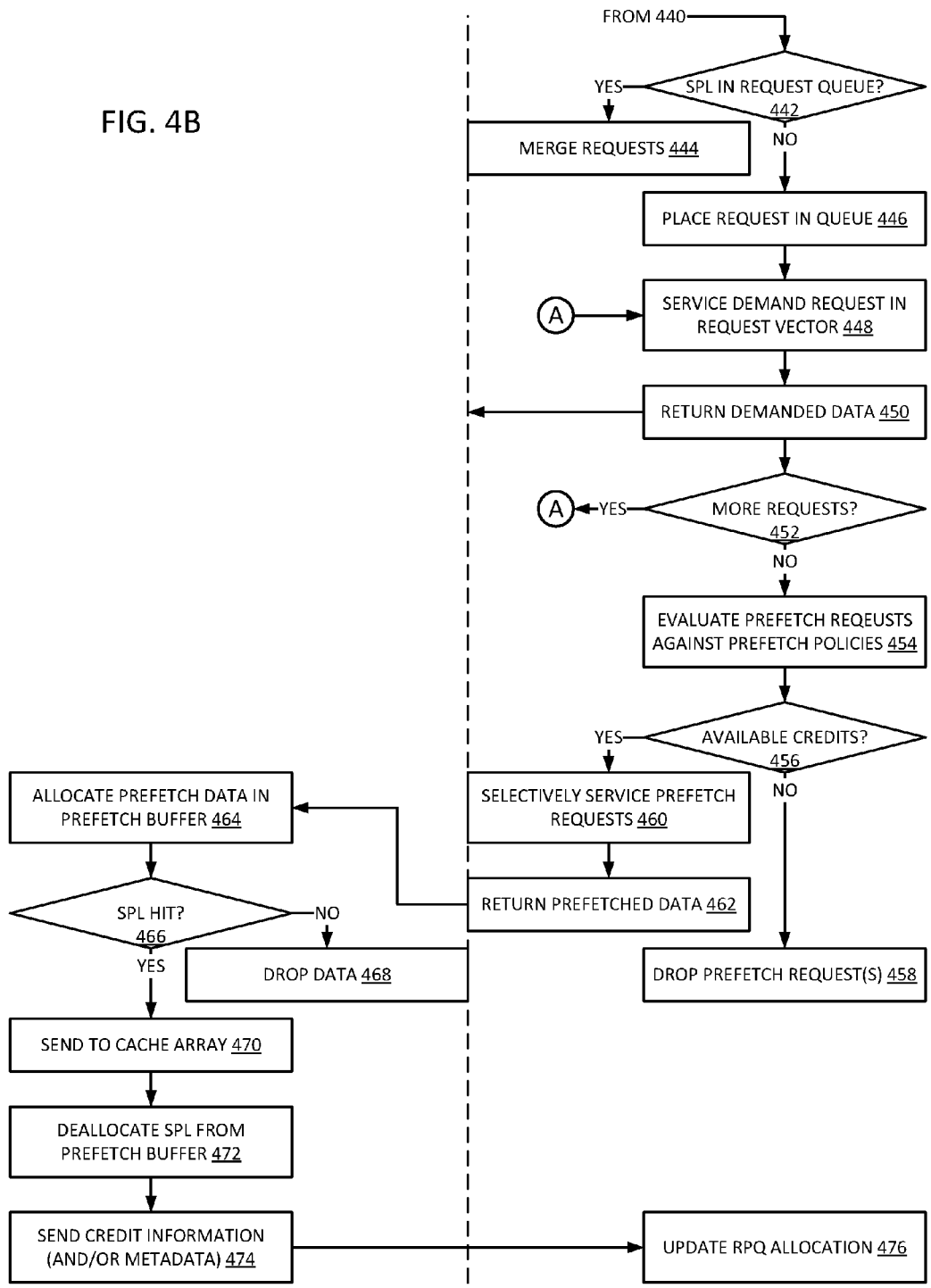

FIG. 4 is a flow diagram of an embodiment of a process for selectively prefetching using a service request vector. In one embodiment, the cache controller is a lower level memory or a prefetch engine for a lower level memory. In one embodiment, the memory controller is a higher level memory or a prefetch servicing engine for a higher level memory. It will be understood that reference to levels of memory refer to memory and/or cache devices in a memory hierarchy. Process 400 occurs as operations and interactions between the cache controller and the memory controller.

The cache controller receives a request for a cache line from a processing core associated with the cache, 402. In one embodiment, the cache controller can receive the request from a lower level cache. In one embodiment, the cache controller can perform a prefetch buffer lookup, 404. The prefetch buffer lookup can determine if the cache controller has the requested cache line in a buffer of data already received from the memory controller, which may not have yet been allocated to the cache array. Thus, the cache controller would have the data, even though the cache line would not necessarily be marked as valid in a superline tag.

The cache controller can determine if the superline associated with the cache line is present in the prefetch buffer with valid data for the requested cache line, 406. If the superline associated with the cache line is found and the cache line data is valid, 406 YES branch, the cache controller can read the cache line data and return it to the processing core of lower level cache that requested it, 408. If the superline associated with the cache line is not found in the prefetch buffer, 406 NO branch, the cache controller can allocate the superline in a request queue, 410.

In one embodiment, the cache controller performs a tag lookup to determine if the superline associated with the requested cache line is already allocated in the cache controller, 412. The cache controller can determine if there is a hit for the superline associated with the cache line, 414. If there is not a hit for the superline (i.e., an SPL miss) in the tag lookup, it will indicate that the cache controller does not have the superline associated with the requested cache line allocated, and thus the cache line will not be found in the cache, 414 NO branch. Thus, the cache controller knows that the cache line will have to be requested from the higher level memory, and generates a request for the cache line (and the superline) from the memory controller, 416. At the memory controller, the memory controller receives the request at a service request engine, 420, and queues the request in a request processing queue, 422. When the memory controller has bandwidth to service the request, the memory controller services the request, 424, and provides the cache line to the cache controller, 426.

If there is a hit for the superline associated with the requested cache line, the cache controller can determine whether the superline has valid data for the cache line, 430. In one embodiment, the cache controller determines the state of the cache line in the cache as MEI (modified (the current value can be returned because it is modified and waiting to be written back up to the memory controller), exclusive (the same value as in the memory controller), or invalid). Thus, if the cache line lookup indicates a status of modified or exclusive (a cache line hit), 430 YES branch, the cache controller can return the data to the requester, 432. If the cache line lookup results in a cache line miss, 430 NO branch, in one embodiment, the cache controller generates a request vector with demand for the requested cache line, 434. The requested cache line could then be referred to as the cache line that caused the cache miss, or a cache line associated with a cache miss.

In one embodiment, the cache controller identifies the state of the other cache lines in the superline, 436, and generates prefetch hint information to include in the request vector based on the state of the other cache lines, 438. The identifying the state of the other cache lines and including prefetch hint information in the request vector can be referred to as modifying the request vector with prefetch information. In one embodiment, the cache controller determines its own load, the load it might know of at the memory controller, whether or not a streaming pattern is indicated, and/or other information to determine whether to generate a prefetch request for a particular cache line. The cache controller sends the request vector to the memory controller, 440.

The memory controller receives the request vector. In one embodiment, the memory controller determines if the superline is already the subject of a request in its request processing queue, 442. If the superline is already in a request in the queue, 442 YES branch, in one embodiment, the memory controller merges the current request with the existing request, 444. If the superline is not already in the queue, 442 NO branch, the memory controller places the current request in the queue, 446. The memory controller services the demand request in the request vector once it has bandwidth to service the request, 448. After servicing the request the memory controller returns the demanded data, 450.

In one embodiment, the memory controller will only service prefetch requests after all demand requests have been satisfied. In another embodiment, the memory controller can provide prefetched data without waiting for all demand requests to be fulfilled. Thus, in one embodiment, the memory controller determines if there are additional demand requests to service, 452. If there are more demand requests to service, 452 YES branch, the memory controller returns to 448 to service the next request in the queue. In one embodiment, if there are no more demand requests to service, 452 NO branch, the memory controller can service prefetch requests or prefetch hint information.

In one embodiment, the memory controller evaluates prefetch hint information against prefetch policies, 454. The memory controller may include one or more prefetch policies that indicate when prefetch data should be accessed from memory and sent back to the cache controller. In one embodiment, a policy indicates a maximum workload or minimum bandwidth that must be available for the memory controller to service prefetch requests. Thus, the memory controller can selectively access data for prefetch requests or drop the prefetch hint information.

In one embodiment, the interface between the cache controller and the memory controller includes the use of credits. The credits provide a flow control mechanism to manage how much prefetch data can be provided from the memory controller to the cache controller. The use of credits can prevent the memory controller from accessing data for a prefetch request only to send it to the cache controller and have the cache controller be unable to receive the data. Thus, in one embodiment, the memory controller determines if there are credits available to send prefetch data to the cache controller, 456. If there are no prefetch credits available, 456 NO branch, the memory controller can delay servicing a prefetch request or drop the prefetch request, 458. If there are prefetch credits available, 456 YES branch, the memory controller can selectively service prefetch requests (for example, in accordance with other policy considerations), 460, and return the prefetched data to the cache controller, 462.

In one embodiment, the cache controller only allocates space in a prefetch buffer when prefetch data is received from the memory controller. Such an approach can prevent the cache controller from having to track every prefetch request made to the memory controller. In one embodiment, the cache controller allocates space in the prefetch buffer in response to receiving prefetch data from the memory controller. Whether in response to receiving prefetch data, or in another implementation, the cache controller allocates prefetched data in the prefetch buffer, 464.

The cache controller can determine whether the prefetch data is associated with a superline that is in the cache controller, which could also be said that the cache controller checks for a superline hit, 466. In certain circumstances, the superline associated with prefetched data can be evicted prior to allocating the data in the cache controller, especially if the memory controller delays the prefetching. If there is not a superline hit, 466 NO branch, the cache controller can drop the data, 468.

If there is a superline hit, 466 YES branch, the cache controller sends the prefetch data to the cache array, 470. The cache array refers to the storage managed by the cache controller, whereas the prefetch buffer is a buffer that is more transient than the storage of the cache array. The cache controller can deallocate the superline from the prefetch buffer when the data is sent to the cache array, 472. In one embodiment, the cache controller sends a credit or credit information to the memory controller when space opens up in the prefetch buffer, 474. Thus, when the cache controller deallocates a superline from the buffer, there is space in the buffer to hold additional data, and the cache controller can indicate that space to the memory controller in the form of a credit or other flow control mechanism. In one embodiment, the cache controller sends other credit information and/or metadata to the memory controller. For example, the cache controller can send an indication of when there is a superline miss when prefetch data is sent to the cache controller (e.g., see 466 NO branch). Thus, the memory controller could drop prefetch hints related to the missing superline to avoid wasting bandwidth by trying to prefetch data for an evicted superline. The memory controller can update the allocation for its read pending queue, 476.

Figure 5:
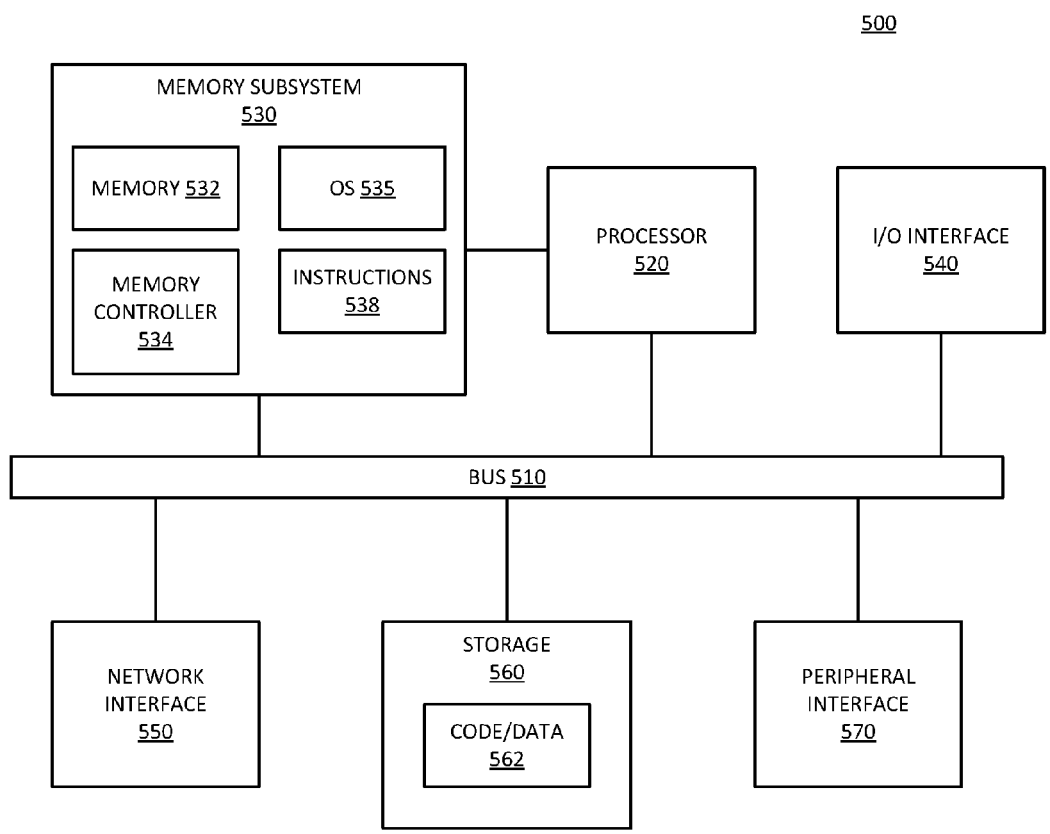
FIG. 5 is a block diagram of an embodiment of a computing system in which dynamic selective prefetching can be implemented.

FIG. 5 is a block diagram of an embodiment of a computing system in which dynamic selective prefetching can be implemented. System 500 represents a computing device in accordance with any embodiment described herein, and can be a laptop computer, a desktop computer, a server, a gaming or entertainment control system, a scanner, copier, printer, routing or switching device, or other electronic device. System 500 includes processor 520, which provides processing, operation management, and execution of instructions for system 500. Processor 520 can include any type of microprocessor, central processing unit (CPU), processing core, or other processing hardware to provide processing for system 500. Processor 520 controls the overall operation of system 500, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

Memory subsystem 530 represents the main memory of system 500, and provides temporary storage for code to be executed by processor 520, or data values to be used in executing a routine. Memory subsystem 530 can include one or more memory devices such as read-only memory (ROM), flash memory, one or more varieties of random access memory (RAM), or other memory devices, or a combination of such devices. Memory subsystem 530 stores and hosts, among other things, operating system (OS) 536 to provide a software platform for execution of instructions in system 500. Additionally, other instructions 538 are stored and executed from memory subsystem 530 to provide the logic and the processing of system 500. OS 536 and instructions 538 are executed by processor 520. Memory subsystem 530 includes memory device 532 where it stores data, instructions, programs, or other items. In one embodiment, memory subsystem includes memory controller 534, which is a memory controller to generate and issue commands to memory device 532. It will be understood that memory controller 534 could be a physical part of processor 520.

Processor 520 and memory subsystem 530 are coupled to bus/bus system 510. Bus 510 is an abstraction that represents any one or more separate physical buses, communication lines/interfaces, and/or point-to-point connections, connected by appropriate bridges, adapters, and/or controllers. Therefore, bus 510 can include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (commonly referred to as "Firewire"). The buses of bus 510 can also correspond to interfaces in network interface 550.

System 500 also includes one or more input/output (I/O) interface(s) 540, network interface 550, one or more internal mass storage device(s) 560, and peripheral interface 570 coupled to bus 510. I/O interface 540 can include one or more interface components through which a user interacts with system 500 (e.g., video, audio, and/or alphanumeric interfacing). Network interface 550 provides system 500 the ability to communicate with remote devices (e.g., servers, other computing devices) over one or more networks. Network interface 550 can include an Ethernet adapter, wireless interconnection components, USB (universal serial bus), or other wired or wireless standards-based or proprietary interfaces.

Storage 560 can be or include any conventional medium for storing large amounts of data in a nonvolatile manner, such as one or more magnetic, solid state, or optical based disks, or a combination. Storage 560 holds code or instructions and data 562 in a persistent state (i.e., the value is retained despite interruption of power to system 500). Storage 560 can be generically considered to be a "memory," although memory 530 is the executing or operating memory to provide instructions to processor 520. Whereas storage 560 is nonvolatile, memory 530 can include volatile memory (i.e., the value or state of the data is indeterminate if power is interrupted to system 500).

Peripheral interface 570 can include any hardware interface not specifically mentioned above. Peripherals refer generally to devices that connect dependently to system 500. A dependent connection is one where system 500 provides the software and/or hardware platform on which operation executes, and with which a user interacts.

In one embodiment, processor 510 and memory subsystem 520 include a memory hierarchy with a lower level memory and a higher level memory. The lower level memory and the higher level memory include a prefetch interface mechanism that enables the lower level memory to provide prefetch hints, and the higher level memory to selectively service the prefetch hints in accordance with any embodiment described herein. The lower level memory generates a request vector with prefetch hint information, and the higher level memory provides data for a demand request, and selectively either services the prefetches or drops the prefetch hint information.

Figure 6:
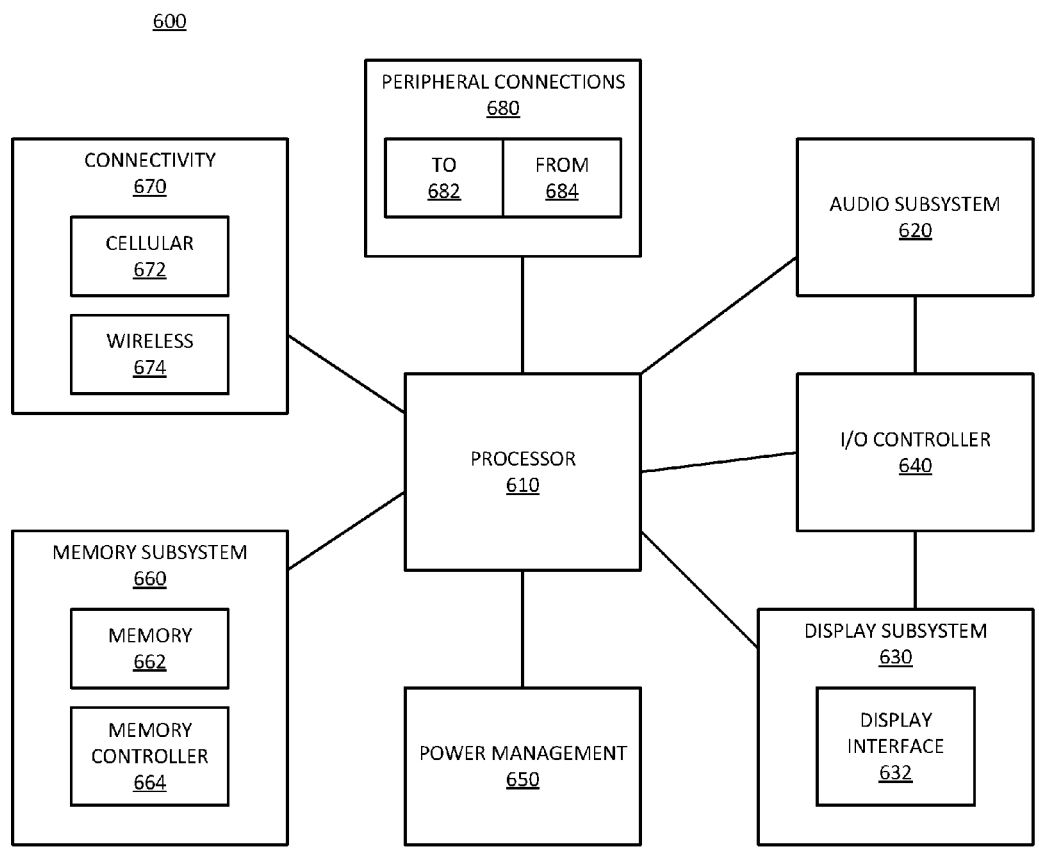
FIG. 6 is a block diagram of an embodiment of a mobile device in which dynamic selective prefetching can be implemented.

FIG. 6 is a block diagram of an embodiment of a mobile device in which dynamic selective prefetching can be implemented. Device 600 represents a mobile computing device, such as a computing tablet, a mobile phone or smartphone, a wireless-enabled e-reader, wearable computing device, or other mobile device. It will be understood that certain of the components are shown generally, and not all components of such a device are shown in device 600.

Device 600 includes processor 610, which performs the primary processing operations of device 600. Processor 610 can include one or more physical devices, such as microprocessors, application processors, microcontrollers, programmable logic devices, or other processing means. The processing operations performed by processor 610 include the execution of an operating platform or operating system on which applications and/or device functions are executed. The processing operations include operations related to I/O (input/output) with a human user or with other devices, operations related to power management, and/or operations related to connecting device 600 to another device. The processing operations can also include operations related to audio I/O and/or display I/O.

In one embodiment, device 600 includes audio subsystem 620, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into device 600, or connected to device 600. In one embodiment, a user interacts with device 600 by providing audio commands that are received and processed by processor 610.

Display subsystem 630 represents hardware (e.g., display devices) and software (e.g., drivers) components that provide a visual and/or tactile display for a user to interact with the computing device. Display subsystem 630 includes display interface 632, which includes the particular screen or hardware device used to provide a display to a user. In one embodiment, display interface 632 includes logic separate from processor 610 to perform at least some processing related to the display. In one embodiment, display subsystem 630 includes a touchscreen device that provides both output and input to a user.

I/O controller 640 represents hardware devices and software components related to interaction with a user. I/O controller 640 can operate to manage hardware that is part of audio subsystem 620 and/or display subsystem 630. Additionally, I/O controller 640 illustrates a connection point for additional devices that connect to device 600 through which a user might interact with the system. For example, devices that can be attached to device 600 might include microphone devices, speaker or stereo systems, video systems or other display device, keyboard or keypad devices, or other I/O devices for use with specific applications such as card readers or other devices.

As mentioned above, I/O controller 640 can interact with audio subsystem 620 and/or display subsystem 630. For example, input through a microphone or other audio device can provide input or commands for one or more applications or functions of device 600. Additionally, audio output can be provided instead of or in addition to display output. In another example, if display subsystem includes a touchscreen, the display device also acts as an input device, which can be at least partially managed by I/O controller 640. There can also be additional buttons or switches on device 600 to provide I/O functions managed by I/O controller 640.

In one embodiment, I/O controller 640 manages devices such as accelerometers, cameras, light sensors or other environmental sensors, gyroscopes, global positioning system (GPS), or other hardware that can be included in device 600. The input can be part of direct user interaction, as well as providing environmental input to the system to influence its operations (such as filtering for noise, adjusting displays for brightness detection, applying a flash for a camera, or other features). In one embodiment, device 600 includes power management 650 that manages battery power usage, charging of the battery, and features related to power saving operation.

Memory subsystem 660 includes memory device(s) 662 for storing information in device 600. Memory subsystem 660 can include nonvolatile (state does not change if power to the memory device is interrupted) and/or volatile (state is indeterminate if power to the memory device is interrupted) memory devices. Memory 660 can store application data, user data, music, photos, documents, or other data, as well as system data (whether long-term or temporary) related to the execution of the applications and functions of system 600. In one embodiment, memory subsystem 660 includes memory controller 664 (which could also be considered part of the control of system 600, and could potentially be considered part of processor 610). Memory controller 664 includes a scheduler to generate and issue commands to memory device 662.

Connectivity 670 includes hardware devices (e.g., wireless and/or wired connectors and communication hardware) and software components (e.g., drivers, protocol stacks) to enable device 600 to communicate with external devices. The external device could be separate devices, such as other computing devices, wireless access points or base stations, as well as peripherals such as headsets, printers, or other devices.

Connectivity 670 can include multiple different types of connectivity. To generalize, device 600 is illustrated with cellular connectivity 672 and wireless connectivity 674. Cellular connectivity 672 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, LTE (long term evolution—also referred to as "4G"), or other cellular service standards. Wireless connectivity 674 refers to wireless connectivity that is not cellular, and can include personal area networks (such as Bluetooth), local area networks (such as WiFi), and/or wide area networks (such as WiMax), or other wireless communication. Wireless communication refers to transfer of data through the use of modulated electromagnetic radiation through a non-solid medium. Wired communication occurs through a solid communication medium.

Peripheral connections 680 include hardware interfaces and connectors, as well as software components (e.g., drivers, protocol stacks) to make peripheral connections. It will be understood that device 600 could both be a peripheral device ("to" 682) to other computing devices, as well as have peripheral devices ("from" 684) connected to it. Device 600 commonly has a "docking" connector to connect to other computing devices for purposes such as managing (e.g., downloading and/or uploading, changing, synchronizing) content on device 600. Additionally, a docking connector can allow device 600 to connect to certain peripherals that allow device 600 to control content output, for example, to audiovisual or other systems.

In addition to a proprietary docking connector or other proprietary connection hardware, device 600 can make peripheral connections 680 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other type.

In one embodiment, processor 610 and memory subsystem 660 include a memory hierarchy with a lower level memory and a higher level memory. The lower level memory and the higher level memory include a prefetch interface mechanism that enables the lower level memory to provide prefetch hints, and the higher level memory to selectively service the prefetch hints in accordance with any embodiment described herein. The lower level memory generates a request vector with prefetch hint information, and the higher level memory provides data for a demand request, and selectively either services the prefetches or drops the prefetch hint information.

Flow diagrams as illustrated herein provide examples of sequences of various process actions. The flow diagrams can indicate operations to be executed by a software or firmware routine, as well as physical operations. In one embodiment, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

To the extent various operations or functions are described herein, they can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:
1. A method comprising:
 detecting a cache miss for a requested cache line in a cache sectored into superlines, each superline including multiple cache lines;

generating a request vector in response to detecting the cache miss, the request vector including a field for each cache line of the superline, the generating including placing a demand request in the field for the cache line that caused the cache miss;

modifying the request vector with prefetch hint information for one or more of the other cache lines allocated in the superline; and sending the request vector to a higher level memory to cause the higher level memory to satisfy the demand request, wherein the higher level memory selectively either performs prefetches for other cache lines of the superline based on the prefetch hint information or drops the prefetch hint information.

2. The method of claim 1, wherein detecting the cache miss is performed by a cache controller, which generates the request vector and sends the request vector to a memory controller.

3. The method of claim 1, further comprising:
receiving prefetch data for a prefetched cache line from the higher level memory; and
returning credit metadata to the higher level memory in response to receiving the prefetch data.

4. The method of claim 3, wherein returning the credit metadata further comprises:
searching the cache for a superline associated with the prefetch cache line; and
indicating to the higher level memory when the search returns a superline miss.

5. The method of claim 1, wherein modifying the request vector with prefetch hint information further comprises:
identifying a state of each cache line allocated in the superline; and
marking the field of one or more cache lines with a prefetch request.

6. The method of claim 5, wherein the higher level memory selectively drops the prefetch request based on workload at the higher level memory.

7. The method of claim 5, further comprising:
allocating space in a prefetch buffer for a cache line whose field is marked with a prefetch request only if the higher level memory performs a prefetch for the cache line and returns the data for the cache line.

8. The method of claim 5, wherein marking the field of one or more cache lines with the prefetch request comprises:
selectively not marking the field of an invalid cache line with a prefetch request.

9. The method of claim 8, wherein selectively not marking the field of the invalid cache line with a prefetch request comprises:
determining how many cache lines in the superline are valid; and
only marking the field of the invalid cache line with a prefetch request if more than a threshold number of cache lines in the superline are valid.

10. An apparatus comprising:
a first memory in a memory hierarchy, the first memory including a first controller having a prefetch servicing engine; and
a second memory in the memory hierarchy, sectored into superlines that each include multiple cache lines, where the second memory is closer to a processor device that is to execute operations based on data stored in the memory hierarchy, the second memory including a second controller having a prefetch request engine;
wherein the second controller is to detect a cache miss for a requested cache line; generate a request vector with the prefetch request engine in response to detection of the cache miss, the request vector including a field for each cache line of the superline, the generation of the request vector including to provide a demand request in the field for the cache line for which the cache miss is detected; modify the request vector with prefetch hint information for one or more of the other cache lines allocated in the superline; and send the request vector to the prefetch servicing engine of the first controller to cause the first controller to satisfy the demand request, wherein the first controller is to selectively either perform prefetches for other cache lines of the superline based on the prefetch hint information or drop the prefetch hint information.

11. The apparatus of claim 10, wherein the first memory is a main system memory and the first controller is a memory controller, and the second memory is a cache memory and the second controller is a cache controller.

12. The apparatus of claim 10, further comprising the second controller to receive prefetch data for a prefetched cache line from the first controller, and return credit metadata to the first controller in response to receipt of the prefetch data.

13. The apparatus of claim 10, wherein the second controller is to modify the request vector with prefetch hint information including to
identify a state of each cache line allocated in the superline; and
mark the field of one or more cache lines with a prefetch request.

14. The apparatus of claim 13, wherein the first controller is to selectively drop the prefetch request based on workload at the first memory.

15. The apparatus of claim 13, wherein the second controller is to mark the field of one or more cache lines with the prefetch request including to selectively not mark the field of an invalid cache line with a prefetch request.

16. An electronic device comprising:
a memory subsystem organized as a memory hierarchy, including
a first memory in a memory hierarchy, the first memory including a first controller having a prefetch servicing engine; and
a second memory in the memory hierarchy, sectored into superlines that each include multiple cache lines, where the second memory is closer to a processor device that is to execute operations based on data stored in the memory hierarchy, the second memory including a second controller having a prefetch request engine;
wherein the second controller is to detect a cache miss for a requested cache line; generate a request vector with the prefetch request engine in response to detection of the cache miss, the request vector including a field for each cache line of the superline, the generation of the request vector including to provide a demand request in the field for the cache line for which the cache miss is detected; modify the request vector with prefetch hint information for one or more of the other cache lines allocated in the superline; and send the request vector to the prefetch servicing engine of the second controller to cause the second controller to satisfy the demand request, wherein the second controller is to selectively either perform prefetches for other cache lines of the superline based on the prefetch hint information or drop the prefetch hint information; and
a touchscreen display coupled to generate a display based on data accessed from the memory subsystem.

17. The electronic device of claim 16, further comprising the second controller to receive prefetch data for a prefetched cache line from the first controller, and return credit metadata to the first controller in response to receipt of the prefetch data.

18. The electronic device of claim 16, wherein the second controller is to modify the request vector with prefetch hint information including to
   identify a state of each cache line allocated in the superline; and
   mark the field of one or more cache lines with a prefetch request.

19. The electronic device of claim 18, wherein the first controller is to selectively drop the prefetch request based on workload at the first memory.

20. The electronic device of claim 18, wherein the second controller is to mark the field of one or more cache lines with the prefetch request including to
   selectively not mark the field of an invalid cache line with a prefetch request.

* * * * *